United States Patent [19]

Goodsman

[11] Patent Number: 4,914,637
[45] Date of Patent: Apr. 3, 1990

[54] MEASURE WHILE DRILLING SYSTEM

[75] Inventor: William G. Goodsman, Calgary, Canada

[73] Assignee: Positec Drilling Controls (Canada) Ltd., Canada

[21] Appl. No.: 386,010

[22] Filed: Jul. 25, 1989

Related U.S. Application Data

[63] Continuation of Ser. No. 7,976, Jan. 29, 1987, abandoned.

[30] Foreign Application Priority Data

Jan. 29, 1986 [CA] Canada .................................. 500578

[51] Int. Cl.4 ............................................. H04H 9/00
[52] U.S. Cl. ......................................... 367/83; 367/84
[58] Field of Search .................................. 367/81–85, 367/912; 181/106; 166/330, 331; 175/40, 48

[56] References Cited

U.S. PATENT DOCUMENTS

| Re. 29,734 | 8/1978 | Manning | 367/83 |
| Re. 30,055 | 7/1979 | Claycomb | 367/84 |
| Re. 30,246 | 4/1980 | Ritcher, Jr. et al. | 367/83 X |
| 2,958,821 | 11/1960 | Webb | 367/83 X |
| 3,309,656 | 3/1967 | Godbey | 367/85 |
| 3,764,968 | 10/1973 | Anderson | 367/84 |
| 3,764,969 | 10/1973 | Cubberly, Jr. | 367/84 |
| 3,770,006 | 11/1973 | Sexton et al. | |
| 3,837,223 | 9/1974 | Ritcher, Jr. et al. | 73/151 |
| 3,958,217 | 5/1976 | Spinnler | 367/83 |
| 3,982,224 | 9/1976 | Patton | |
| 3,997,867 | 12/1976 | Claycomb | 367/83 |
| 4,351,037 | 9/1982 | Scherbatskoy | |
| 4,405,021 | 9/1983 | Mumby | |
| 4,515,225 | 5/1985 | Dailey | |
| 4,531,579 | 7/1985 | Larronde et al. | 175/48 X |
| 4,550,392 | 10/1985 | Mumby | 367/82 |
| 4,655,289 | 4/1987 | Schoeffler | 175/48 X |

FOREIGN PATENT DOCUMENTS

| 425996 | 3/1945 | Canada . |
| 952618 | 8/1974 | Canada . |
| 959825 | 12/1974 | Canada . |
| 978175 | 11/1975 | Canada . |
| 1033447 | 6/1978 | Canada . |
| 1165853 | 4/1979 | Canada . |
| 1057387 | 6/1979 | Canada . |

Primary Examiner—Thomas H. Tarcza
Assistant Examiner—Tod Swann
Attorney, Agent, or Firm—Larson and Taylor

[57] ABSTRACT

In a fluid communication device such as a measure-while-drilling well-logging tool of the type in which the information concerning the downstream parameters that are measured is transmitted upstream, e.g. to the surface of the earth, in the form of positive pressure pulses in the drilling fluid, a pressure modulator for generating the pulses is driven by the drilling fluid passing through the tool. The pressure modulator is controlled by a solenoid actuated latching means which has low power requirements as compared to known measure-while-drilling logging tools.

29 Claims, 14 Drawing Sheets

MEASURE WHILE DRILLING SYSTEM

This application is a continuation of application Ser. No. 07/007,976 filed Jan. 29, 1987, now abandoned.

FIELD OF THE INVENTION

This invention relates to a new or improved fluid communication device such as a well-logging tool, and in particular to a tool of the logging-while-drilling or measure-while-drilling (MWD) type. In measure-while-drilling tools, sensors or transducers positioned at the lower end of the drill string continuously or intermittently monitor predetermined drilling parameters such as temperatures or pressures, or directional, logging or mechanical parameters, and the tool transmits the appropriate information to a surface detector. Typically such MWD tools are positioned as one of the cylindrical drill collars close to the drill bit and utilize a system of telemetry in which the information is transmitted to the surface detector in the form of pressure pulses through the drilling fluid or drilling mud that is normally circulated under pressure through the drill string during drilling operations.

DESCRIPTION OF THE PRIOR ART

Prior art examples of measure-while-drilling tools are shown in U.S. Pat. No. 2,787,759 Arps, U.S. Pat. No. 2,887,298 Hampton, U.S. Pat. No. 3,309,656 Godbey, U.S. Pat. No. 4,078,620 Westlake et al, U.S. Pat. No. 4,001,773 Lamel et al, U.S. Pat. No. 3,964,556 Gearhart et al as well as in Canadian Patents Nos. 425,996, Hassler, and 959,825 and 978,175 granted to Mobil Oil Corporation. Hitherto, the MWD well-logging tools that have been available have been large, complex, and expensive, and have suffered from numerous disadvantages. Thus, known MWD tools have not been retrievable through the drill string, and in order to recover such tools it was necessary to withdraw the drill string from the drill hole. Such tools furthermore have required complex and expensive power systems and drive transmissions to power the signal means by which the desired information is transmitted Since it is not economically feasible to run an electrical power supply cable through a drill string, this in turn has entailed a requirement for bulky and expensive battery packs or turbine power generating systems to be included in the tool. Such tools also had the disadvantage of being large metal structures requiring expensive heavy equipment to machine, assemble, test and transport them. These problems are avoided by the improved MWD well-logging tool disclosed herein.

SUMMARY OF THE INVENTION

The present invention provides a remote sensing system comprising a tool for positioning at a predetermined location in a conduit through which a flow of fluid is circulated, said tool including a pressure modulator adapted to transmit signals indicative of selected parameters existing at said location, such signals being in the form of positive pressure pulses transmitted through the fluid to a remote receiver, said pressure modulator comprising: a passage means in said tool through which at least a portion of said fluid flow is to be directed; blocking means movable successively to and from an operative condition wherein it effects rapid, temporary, at least partial restriction of said passage means to generate said positive pressure pulses, said blocking means being responsive to said fluid flow to be urged thereby to move continuously to and from said operative condition; latching means effective to control movement of said blocking means; and electrical actuator means for said latching means selectively energizable to release said latching means in stepwise manner to permit incremental movement of said blocking means to and from its operative condition.

The blocking means is preferably a rotor element that is rotatably mounted in the tool in the path of the drilling fluid flow and is so designed that the drilling fluid flow applies a continuous torque to the rotor so that it is incrementally rotated each time it is released by the latching means, to effect restriction of the passage and generate the desired pressure pulse. The drilling fluid is preferably directed through angled vanes on a coupled impeller to impart reactive torque to the rotor. Because of this direct coupling, there is no need to change the mechanical energy of the drilling fluid flow into electrical energy using electro-mechanical devices and electrical power regulating circuits, and accordingly the mechanism required is not complex. Furthermore, the power requirements of the tool are low as compared to prior art tools, since the latching mechanism requires comparatively little power to cause a change in state, in contrast to arrangements wherein the change in restriction of a passage is effected by mechanical means driven by generated electrical power. Since the direct coupling decreases the complexity and electrical power requirements of the tool as compared to known positive pressure MWD tools, the tool of the present invention should be of reduced cost and greater reliability.

A well-logging tool incorporating the sensing system is preferably of elongate form and of such width that it can slide within the bore of a drill string from the surface to the desired deployment location, the lower end of the tool carrying a conventional mule shoe and stinger that can be centered in a conventional mule shoe sleeve positioned at the lower end of the drill string. Alternatively, the instrument may be set on a conventional baffle plate if orientation parameters are not desired. The tool may be slipped into a diameter reducing polish sleeve if required, which would hang from the upper box end of the collar into which he tool is inserted. The polish sleeve would hang by a larger diameter lip and would be sealed on the outside of the polish sleeve. The upper end of the tool preferably includes a spear point assembly that can be engaged, lowered within the drill string, and released by a standard oil field "soft-release" tool. For retrieval, the top of the spear point is designed to be captured and retrieved by a standard oil field "overshot" tool lowered within the drill string by a cable to latch onto the spear point.

BRIEF DESCRIPTION OF THE DRAWINGS

The invention will further be described, by way of example only, with reference to the preferred embodiment thereof that is illustrated in the accompanying drawings wherein.

DESCRIPTION OF THE PREFERRED EMBODIMENTS

Figure 1:
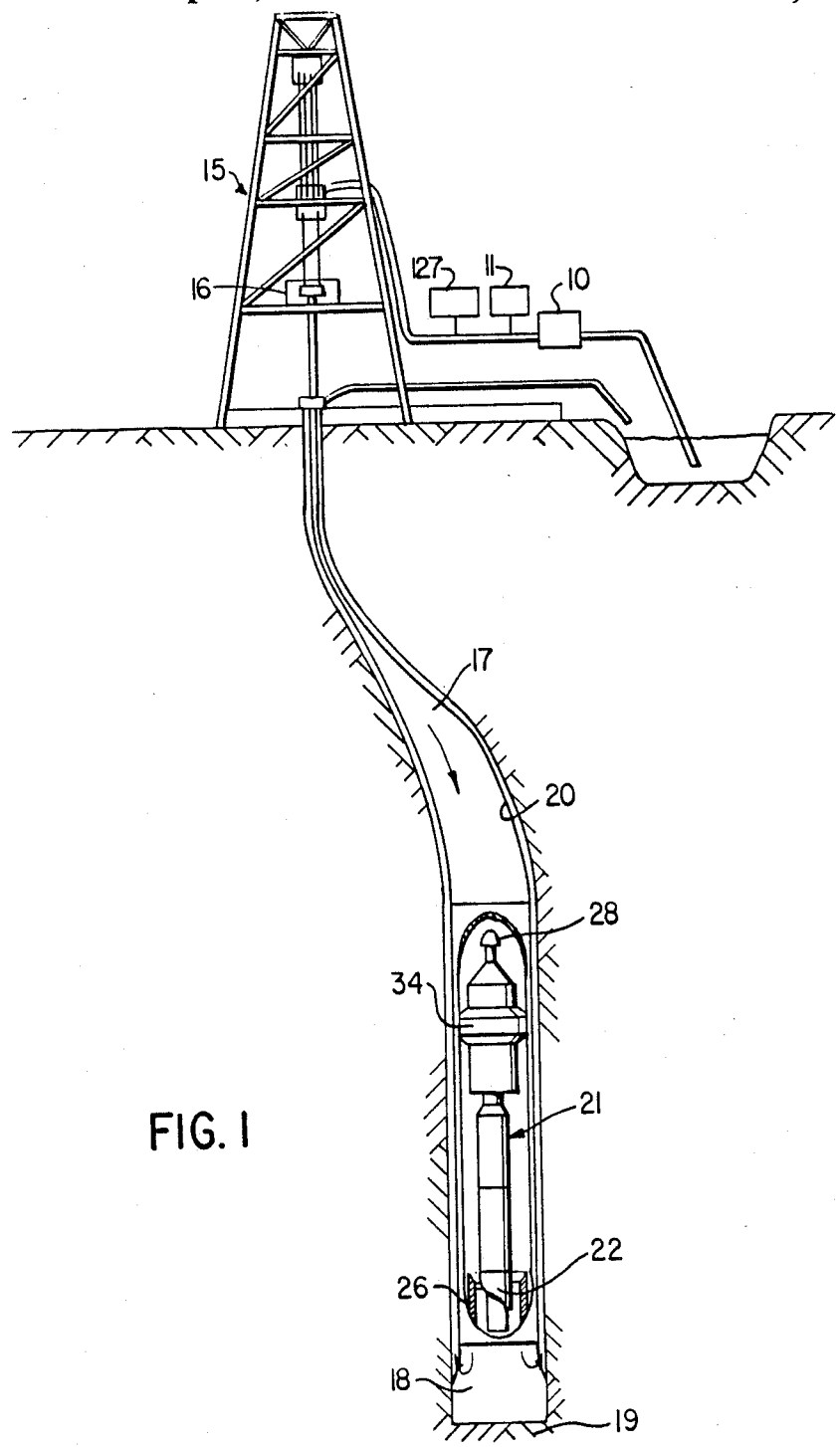
FIG. 1 is a somewhat schematic view of a drilling installation for drilling a hole in an underground formation.

Referring to FIG. 1, a drilling rig 15 in known manner mounts a drive mechanism 16 that provides a driving torque to a drill string 17 the lower end of which carries a drill bit 18 for drilling a hole in an underground formation 19. Alternatively the bit may be rotated by a 'mud motor' which is powered by the action of the pressure or flow of the drilling fluid, such motor being at the bottom of the drilling string at the bit therefore not requiring the drill string be rotated. This motor mechanism is frequently used for controlled directional drilling. As is well known, the drill string comprises a series of tubular drill collars that are successively interconnected and define a continuous bore through which a flow of drilling fluid from a positive displacement pump 10 which has its flow variations smoothed by an accumulator or pulsation dampener 11, (as known in the drilling industry) is delivered to the bottom of the drill hole to cool the drill bit and carry away the cuttings which become entrained in the drilling fluid and pass upwards between the outside of the drill string and the surrounding wall of the drill hole.

In most drilling applications, it is important to monitor on a continuous or intermittent basis certain parameters of the drilling process such as the temperature direction and orientation at the bottom of the drill hole, the strain applied to the drill collar, and various characteristics of the formation in which the drill is operating. For this purpose a well-logging tool 21 is provided within the bore of the drill string. The tool 21 is generally of elongated cylindrical form, and carries at its base a generally tubular mule shoe and stinger 22 which has a curved lower edge 23 the uppermost portion of which leads to an axially extending groove 24 which is engaged by a mule shoe key 25 fixed in the wall of a tubular mule shoe sleeve 26. The mule shoe sleeve 26 (which is illustrated only schematically) is a conventional element having external webs (not shown) that sit on a ledge of a short orientation sub and is fixed by set screws or the like. The sleeve 26 carries the key 25 fixed thereto and extending radially inwardly. When the tool 21 is lowered to the bottom of the drill string, the lower edge 23 of the mule shoe engages the key 25 and causes the tool to rotate until the key enters the axial groove 24, thereby fixing the orientation of the tool with respect to the sleeve 26. The weight of the tool 21 is borne by the engagement between the key 25 and the upper end of the groove 24. Alternatively mating shoulders could be provided on the mule shoe and mule shoe sleeve.

The upper end of the tool 21 is provided with a spear point assembly 28 by means of which the tool can be manipulated by a standard oil field "soft release" tool lowered on a cable within the drill string to release the spear point when the tool has been placed into position, or an "over-shot" may be used to engage the spear point when the tool is to be retrieved and brought to the surface. The assembly 28 essentially comprises an axial shaft 29 having an enlarged head 30 suitably configured for engagement by the overshot tool.

Figure 2A:
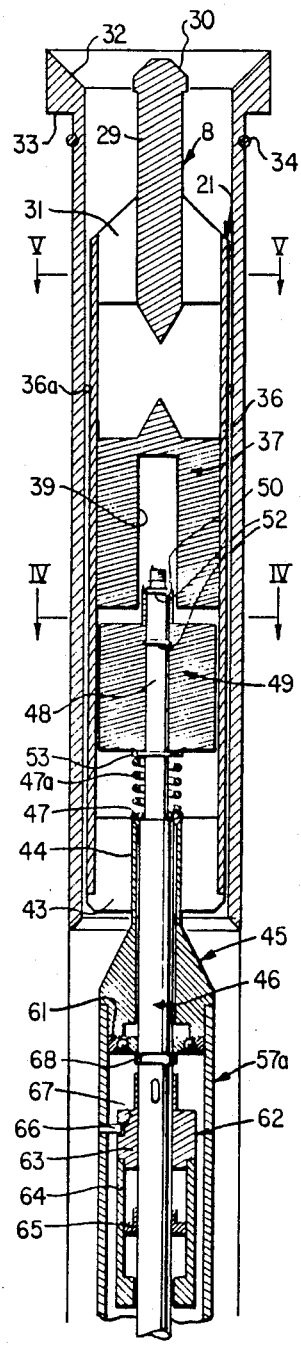
FIGS. 2A and 2B together constitute a longitudinal sectional view of a first embodiment of a logging tool for use in the drilling installation of FIG. 1.

At an intermediate point in the length of the shaft 29 are radially extending axially oriented webs 31 the outer ends of which meet a tubular containment sleeve 36. Suitable seals (not shown) may be provided on the exterior of the sleeve 36 for engagement with the bore of the drill string collar. If the difference in these diameters is great, a diameter reducing polish sleeve 32 is interposed. As shown in FIG. 2A the upper end of the polish sleeve 32 is formed with an annular shoulder 33 that seats in a step (not shown) in the drill collar and carries seals 34 on its exterior. In this case the containment sleeve 36 forms a seal 36a against the bore of the polish sleeve 32.

Figure 4:
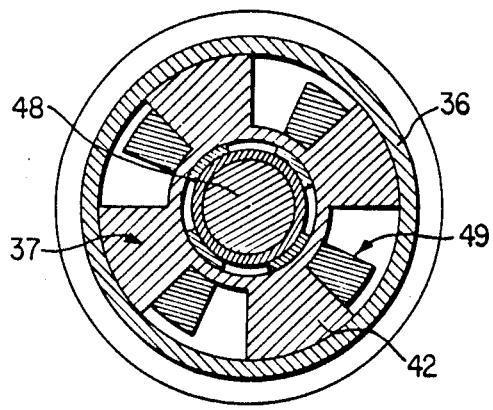
FIGS. 4 and 5 are sectional views taken on the lines IV—IV and V—V respectively in FIG. 2A.
Figure 5:
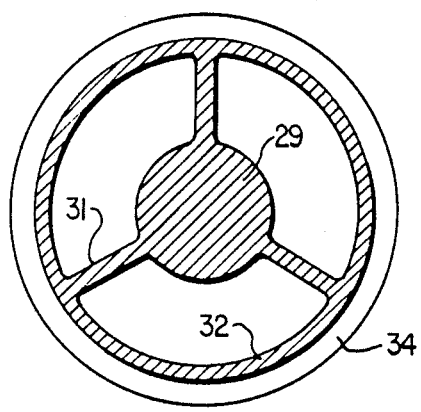

A stator 37 fixed in the sleeve 36 has at its lower end a counterbore 39. The form of the stator 37 is more clearly illustrated in relation to FIGS. 4 and 7, from which it can be seen that the stator comprises a cylindrical body from which extends a series of helically arranged vanes 42 the outer edges of which lie against and are fixed to the interior of the containment sleeve 36 so that the stator defines, with the containment sleeve, an arrangement of axially and angularly extending passages for the flow of drilling fluid therethrough. As is clearly seen in FIG. 7, the vanes 42 increase in thickness towards their lower ends so that the intervening passages become progressively more restricted towards their lower ends.

The lower end of the containment sleeve has fixed therein an array of radial webs 43 carried on the tubular hub 44 of a reducer 45, these webs 43 defining passages for the outflow of drilling fluid from the lower end of the containment sleeve 36. A shaft assembly 46 is journalled to rotate with respect to the hub 44 and carries a rotary seal 47 at the upper end of the hub which seal is held down by the lower end of the rotor 49 to prevent the ingress of drilling fluid. An upper section 48 of the shaft assembly 46 projects into the counterbore 39 of the stator and carries adjacent to the lower end of the stator a rotor element 49 which is more clearly illustrated in FIG. 8. A compression spring 47a located on the shaft section 48 below rotor 49 presses the seal 47 firmly against the reducer hub 44. The rotor 49 is keyed to the shaft section 48 and is fixed by a fastener 50 to rotate with the shaft assembly 46 and has defined in the periphery thereof a series of generally axially extending channels 51 corresponding in number and spacing to the vanes 42 of the stator, the channels 51 being of progressively greater angular extent from the upper end of the rotor to its lower end, as is clearly seen in FIG. 8. The channels 51 thus define spaced ribs 55 on the periphery of the rotor 49, and as can be seen from FIGS. 4, 7 and 8, the angular extent of the upper end 56 of the ribs 55 is sufficient to effectively occlude the lower end of the passages between the vanes 42 of the stator, when the rotor is turned to bring the ribs 55 into register with these passages. O-ring seals 52 prevent fluid flow between the rotor 49 and the shaft section 48. The rotor 49 is supported by an annular shoulder 53 on the shaft section 48.

The reducer 45 flares outwardly in conical form below the hub 44 and forms a seating connected to the top end of a tubular upper latch sleeve 57a that in turn connects to a lower latch sleeve 57b the lower end of which is connected to a cylindrical solenoid housing 58 beneath which is connected a compensator housing 59. The lower end of the compensator housing 59 is in turn connected to a cylindrical barrel 60 to contain the electronic and power supply components (not shown) the bottom end of which barrel carries the mule shoe 22.

The shaft assembly 46 is carried in spaced upper and lower bearings 61 located in the upper latch sleeve 57a. A dampener assembly 62 is mounted near the upper end of the interior of the upper latch sleeve 57a and comprises a dampener driver 63 in the form of a cylindrical collar that is keyed to rotate with the shaft assembly 46, but is axially slidable with respect thereto. The collar 63 forms one end of a cylinder assembly 64 which cooperates with an annular piston 65 that is fixed with respect to the shaft assembly 46. In the wall of the latch sleeve 57a is fixed a pin 66 which projects radially inwardly and is received in a groove 67 in the collar 63. As is more clearly shown in FIG. 10, the groove 67 extends around the periphery of the collar 63 in an oscillating manner, i.e. varying in its axial position. Thus upon rotation of the dampener assembly with the shaft 46, the interaction of the pin 66 in the groove 67 will cause the dampener assembly 62 to oscillate in the axial direction of the shaft, this oscillation (and hence the rotational movement of the shaft assembly 46) being dampened by displacement of hydraulic fluid within the cylinder 64 from one side to the other of the piston 65. The dampener assembly 62 thus acts in the manner of a hydraulic damper.

Figure 2B:
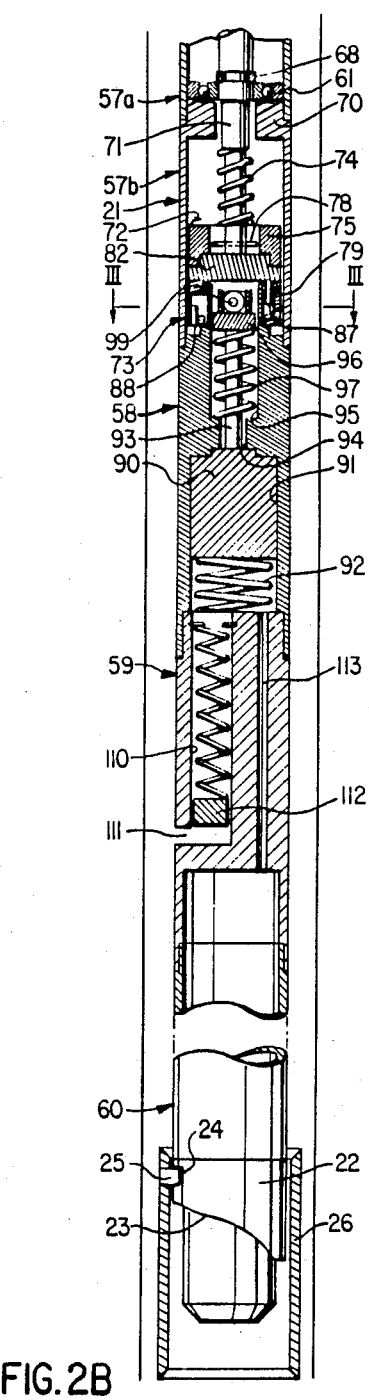
Figure 3:
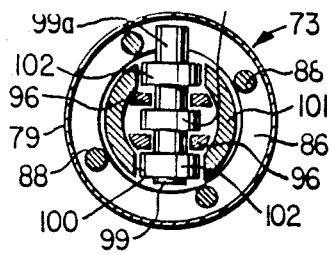
FIG. 3 is a sectional view taken on the line III—III in FIG. 2B.

The shaft assembly 46 is centered with respect to the latch sleeve 57a by means of the bearings 61, and is located axially with respect thereto by a pair of collars 68 positioned adjacent each of the bearings 61 as shown in FIGS. 2A and 2B.

The lowermost of the two bearings 61 is seated on a flange 70 at the top of the lower latch sleeve 57b. A lower extension 71 of the shaft assembly 46 projects downwardly into the lower latch sleeve 57b and is connected to a torsion drive assembly 72 which is in turn coupled to a latch arrangement 73 that will be explained in more detail below.

The shaft extension 71 is surrounded by a compression drive spring 74 which is compressed between a shoulder on the shaft and the upper side of a torsion drive element 75. As is more clearly seen in FIG. 9, the torsion drive element 75 is of generally cylindrical form having a central bore 76 traversed by a diametrical slot 77. The lower shaft extension 71 is received in the bore 76, a pin 78 on the shaft extension 71 being received in the slot 77. The torsion drive element 75 is received with clearance within the lower latch sleeve 57b and is constrained by the interaction of the pin 78 with the slot 77 to follow the rotational movements of the shaft assembly 46, although not being fixed axially with respect thereto.

The latch arrangement 73 has a latch cage formed by generally cylindrical housing 79 received within the lower latch sleeve 57b immediately below the torsion drive assembly 72. A pair of diametrically opposed lugs 80 project downwardly from the underside of the torsion drive element 75. A second pair of diametrically opposed lugs 80 project upwardly from the latch housing 75. A flat resilient spring element 82 of hard rubber is positioned between the torsion drive element 75 and the latch housing 79, and has four radially projecting arms 83 each of which is positioned between a pair of lugs 80, 81 so that rotation of the torsion drive element 75 is transmitted to the housing 79 through gripping of the arms 82 of the spring in between the lug pairs 80 and 81. The spring element 82 is of about 55 to 70 durometer hardness, and may be of neoprene or another rubber suitable for use in the operating temperatures encountered.

The latch arrangement 73 will now be explained with particular reference to FIGS. 2B, 3, 6 and 11. As mentioned above, the cylindrical housing or latch cage 79 is constrained to follow the rotation of the shaft assembly 46 by virtue of the torsion drive arrangement 72.

Figure 6:
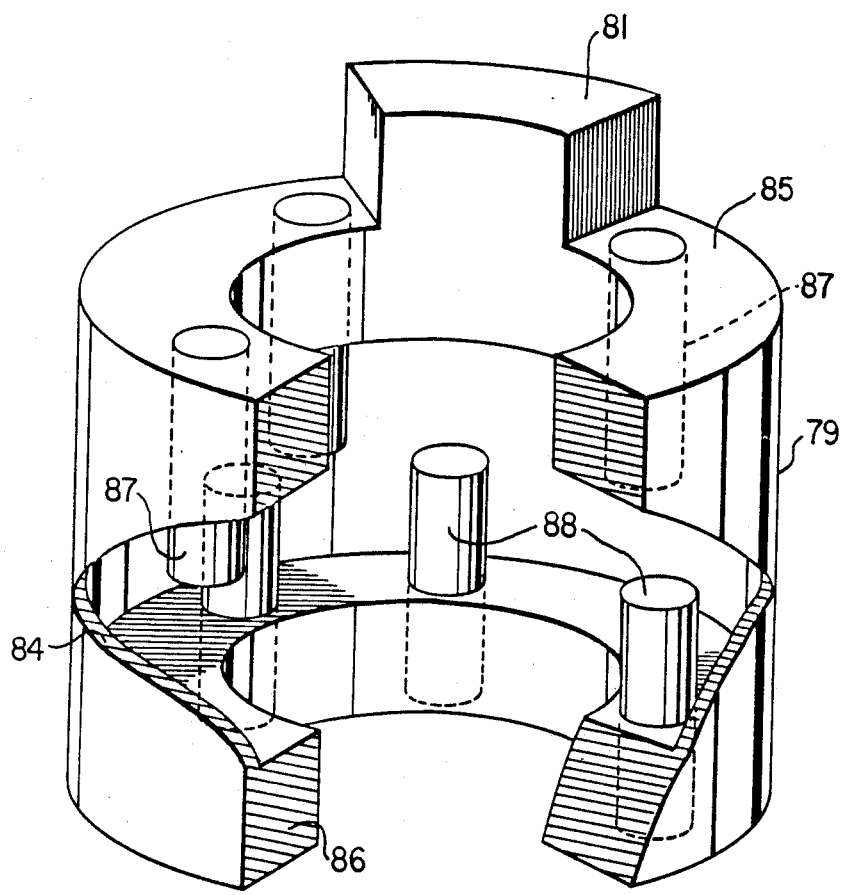
FIG. 6 is an enlarged perspective view partly sectioned showing a detail of the tool seen in FIG. 2B.

As seen in FIG. 6, the cylindrical housing 79 of the latch arrangement comprises a tubular wall 84 to which are affixed a pair of spaced annular upper and lower rings 85 and 86 respectively, the lugs 81 being formed integrally with the upper ring. FIG. 6 illustrates the housing 79 with parts removed to show the interior detail. The housing 79 provides a hollow cylindrical cage, and fixed in the upper ring 85 are four downwardly projecting pins 87 arranged at equal angular intervals around the longitudinal axis of the tool. Likewise, there are four equiangularly spaced pins 88 projecting upwardly from the lower ring 86, the lower pins being offset angularly by 45° with respect to the upper pins.

Within the solenoid housing 58 there is mounted a solenoid 90 carried in a bore 91 and urged upwardly by a compression spring 92. An axially arranged rod 93 projects upwardly from the solenoid plunger and is slidably guided in a bore by which opens into an enlarged counterbore 95 that opens to the upper end of the solenoid housing 58. At the upper end of the solenoid rod 93 is fixed a cross-piece 96 (FIG. 11), and a helical compression spring 97 surrounding the rod 93 engages under the cross-piece 96 and urges the rod continuously upwards. The cross-piece 96 supports bearings 103 for a transversely arranged latching shaft 99 (see FIGS. 3 and 11). The shaft 99 is positioned within a diametrically arranged axially extending transverse guide slot 100 formed in a sleeve extension 101 on the upper end of the solenoid housing 58. The walls of the guide slot are engaged by rollers 102 by means of which the shaft 99 is guided for movement axially of the tool, the interaction of the rollers with the guide slot preventing rotation of the shaft 99 and solenoid rod 93 about the axis of the tool. One end of the shaft 99 projects radially beyond the sleeve 101 to form a detent 99a lying in the path of movement of the pins 87, 88 of the latch cage 79. This shaft 99 is free to rotate in the rollers 102 and can rotate with respect to the cross-piece 96 in a bearing 103.

The spring 97 surrounding the solenoid rod 93 urges the shaft 99 upwardly to place the detent 99a in the path of movement of the upper pins 87 of the latch cage 79. In this position, when one of the upper pins 87 engages the detent, rotation of the latch cage 79, and hence of the rotor 49 to which it is connected through the shaft assembly 46, is prevented. When the solenoid 90 is energized, the rod 93 is drawn downwardly, moving the detent 99a out of the path of the upper pins 87 and into the path of the lower pins 88 so that the latching cage 79, and hence the rotor 9, can rotate until one of the lower pins engages the detent, this rotation amounting to 45°. When the solenoid 90 is de-energized, the shaft 99 is moved upwards by the spring 97 to disengage the lower pin 88 and free the latch cage 79 for a further incremental rotation of 45° until the next upper pin 87 is engaged.

The solenoid housing 58 protects the solenoid from the drilling fluid and is threaded to the lower end of the lower latch sleeve 57b and secured thereto in a fixed rotational orientation with respect to the stator 37 so that through the fixed orientations of the various parts, the rotor 49 is in a predetermined rotational orientation with respect to the stator 37 when the solenoid 90 is de-energized. This predetermined orientation corresponds to a substantial alignment or registration between the channels 51 in the rotor 49, and the passages between the vanes 42 of the stator 37 so that the resistance to flow of the drilling fluid through the rotor 49 is minimized.

The flow of drilling fluid passing through the upper end of the tool in a generally axially direction as indicated by the arrows in FIG. 2A, is given an angular momentum by the vanes 42 of the stator as it passes thereover, and accordingly applies a torque to the rotor 49 as the drilling fluid passes through the channels 51 therein. However, as will be appreciated from the foregoing, the rotor 49 is not free to rotate, since its rotation is closely controlled by the latch arrangement 73, and rotation is prevented when the detent 99a is in contact with one of the pins 87, 88 in the latch cage 79.

When the solenoid 90 is energized and the detent 99a is drawn downwardly to disengage from the upper pin 87, the latch cage 79, and hence the rotor 49, are free to rotate through an angle of 45° until one of the lower pins 88 comes into engagement with the detent 99a. The rotor 49 is thus arrested in a position wherein the broad upper end 56 of the ribs 55 substantially completely occlude the lower ends of the channels through the stator 37, this occlusion giving rise to a pressure pulse which travels through the drilling fluid and can be detected at the earth's surface.

In order to prevent the premature erosion of the modulator parts due to the high velocity impingement of particles suspended in the drilling fluid, they are made of hard materials or coated, diffused or scintered with hard materials such as titanium carbide. Special areas of concern are the bottom of the stator vanes 42, the top and sides of the rotor vanes 55, and the inside of the containment sleeve 36 enclosing these parts.

It is necessary to protect the internal components of the well-logging tool from the effects of the drilling fluid. Thus the reducer, the upper and lower latch sleeves 57a, 57b, the solenoid housing, and the compensator housing are filled with oil. The compensator housing 59 includes a compensator arrangement whereby the pressure of this oil is increased to correspond to the pressure of the surrounding drilling fluid as this increases when the tool 21 is lowered progressively deeper into the drill hole. To this end, the compensator housing includes a cylindrical bore 110 the lower end of which has an opening 111 that communicates to the exterior of the tool 21 and the drilling fluid that surrounds it. Within the bore 110 is a spring-loaded piston 112. As the pressure of the drilling fluid surrounding the tool 21 increases, the piston 112 is pushed upwardly in the bore producing a compensating increase in the pressure of the oil therein, and of the oil contained throughout the interior spaces of the tool, these spaces communicating with the bore 110 through suitable passage means (not shown).

Beneath the compensator housing 59 is coupled a barrel arrangement 60 which contains the electrical power supply and electronic controls (not shown) that are utilized to control the operation of the latch arrangement 73. A suitable passage 113 is provided in the compensator housing 59 to connect the control cables (not shown) between the solenoid 90, and the electronic controls, this passage also communicating the oil to the interior of the barrel 60 up to a bulkhead connector which excludes the pressure of the oil from the electrical power supply and electronics module and ensuring the oil pressure therein is equalized with the pressure of the exterior drilling fluid.

The compensator arrangement thus compensates for changes in pressure applied to the tool by the drilling fluid, due to variations in depth at which the tool operates As the tool is lowered, the increasing pressure of the surrounding drilling fluid will move the piston 112 to similarly pressurize the oil within the tool. If there is any air within the tool this will likewise be compressed.

Figure 15:
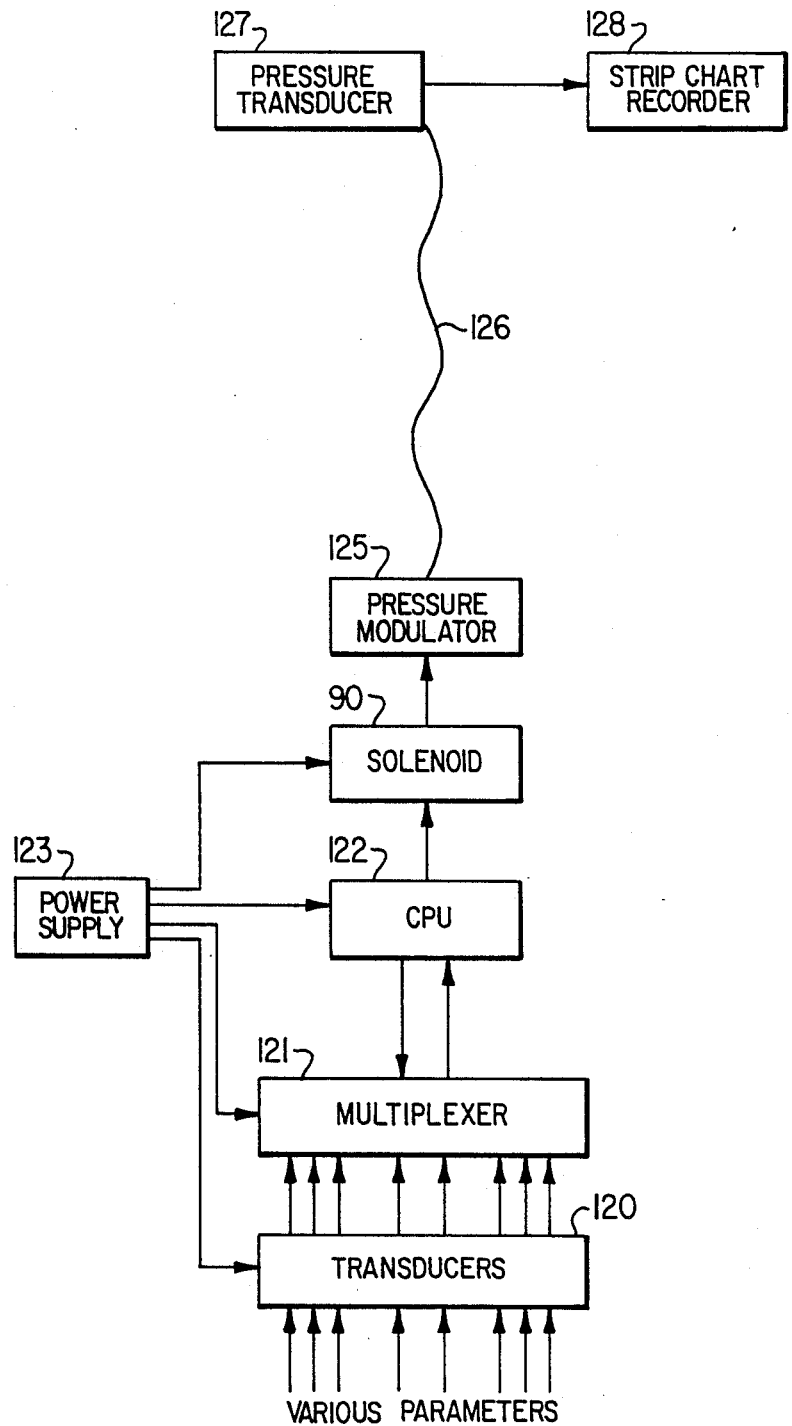
FIG. 15 is a schematic view illustrating the functions performed by the well-logging tool.

The operation of the tool will now be described. The barrel 60 contains the interconnection system and various transducers for the downhole parameters to be measured. The barrel will also contain a pressure transducer so that the tool can receive pressure signals from the earth's surface. Likewise the barrel includes the measurement and control electronics and the power source for the system. These components are neither illustrated or described in any detail herein, except with respect to the schematic diagram in FIG. 15. These components are of known kind and do not form a part of the present invention. Referring to FIG. 15 therefore, the required downhole parameters are measured by suitable transducers 120 the signals from which are fed via a multiplexer 121 to a central processing unit 122 which controls actuation of the solenoid 90, the system being energized by a power supply 123 which will be provided by a suitable electrical battery or power generating turbine assembly. Actuation of the solenoid controls the pressure modulator 125 (i.e. the positioning of the faces 56 of the rotor with respect to the passages in the stator) which generates the pressure pulse signals transmitted upwardly through the drill hole as represented by the line 126 in FIG. 15 to a pressure transducer 127 on the drilling rig 15, signals from the pressure transducer 127 being duly connected to a strip chart recorder 128 or other suitable decoding apparatus. The readings from the strip chart recorder reveal the values of the downhole parameters that are being measured and make it possible to monitor the downhole conditions on a continuous or intermittent basis as required.

As has been mentioned above, the tool 21 is comparatively simple and less complex than other known tools for the same purpose, these advantages deriving primarily from the fact that the driving force for the pressure modulator 125 is derived directly from the drilling fluid itself, and accordingly it is not necessary to provide the power supply and drive transmission that were previously included in such tools for this purpose. Instead, the pressure modulator is controlled merely by actuation of the latching mechanism 73, this in turn being effected by the solenoid 90. Because of this arrangement, there is no need to change the mechanical energy of the drilling fluid flow into electrical energy using electro-mechanical devices and electrical power regulating circuits. Accordingly, because of the reduced complexity the tool 21 should have an improved reliability as compared to those previously used.

The dampener assembly 62 and the torsion spring 82 together cooperate to control rotation of the rotor 49 and of the latch cage 79 to prevent damage to the components of the latch assembly during operation thereof. Depending upon the angle of the blades 42 of the stator and the velocity and density of the drilling fluid, the torque applied to the rotor 49 could be very high. Since the moment of inertia of the rotor 49 and the associated shaft assembly 46 and latch arrangement 73 is comparatively small, the torque applied by the flow of drilling fluid would produce a very large angular acceleration of these parts if unrestricted, and this in turn would cause rapid wear and damage to the components of the latch arrangement 73, and in particular the interengaging parts of the detent 99a and the latch pins 87 and 88. If the angular acceleration applied to the assembly were left unchecked, the latch cage 79 would achieve a large angular velocity when released by the detent 99a, and even when turning through only 45° might upon impact with the next pin 87, 88 produce sufficiently large stresses as to cause damage. Such stresses have to be reduced to remove the possibility of damage or fracture of the various components, since this would of course cause tool failure and loss of signal. Even at a lesser level, such high speed impact might produce over time indentations in the pins of the latching cage which might prevent the detent 99a disengaging smoothly from these pins when the solenoid 90 is actuated.

The dampener assembly 62, the operation of which is described in the foregoing, has the effect of limiting the angular velocity that can be achieved by the rotor and main shaft assembly 46 so that the velocity with which the pins 87, 88 of the latching cage 79 engage the detent 99a is greatly reduced. The dampener assembly 62 also acts to minimize or reduce oscillation of the assembly once initial contact has been made between the detent 99a and the appropriate pin 87, 88.

Figure 9:
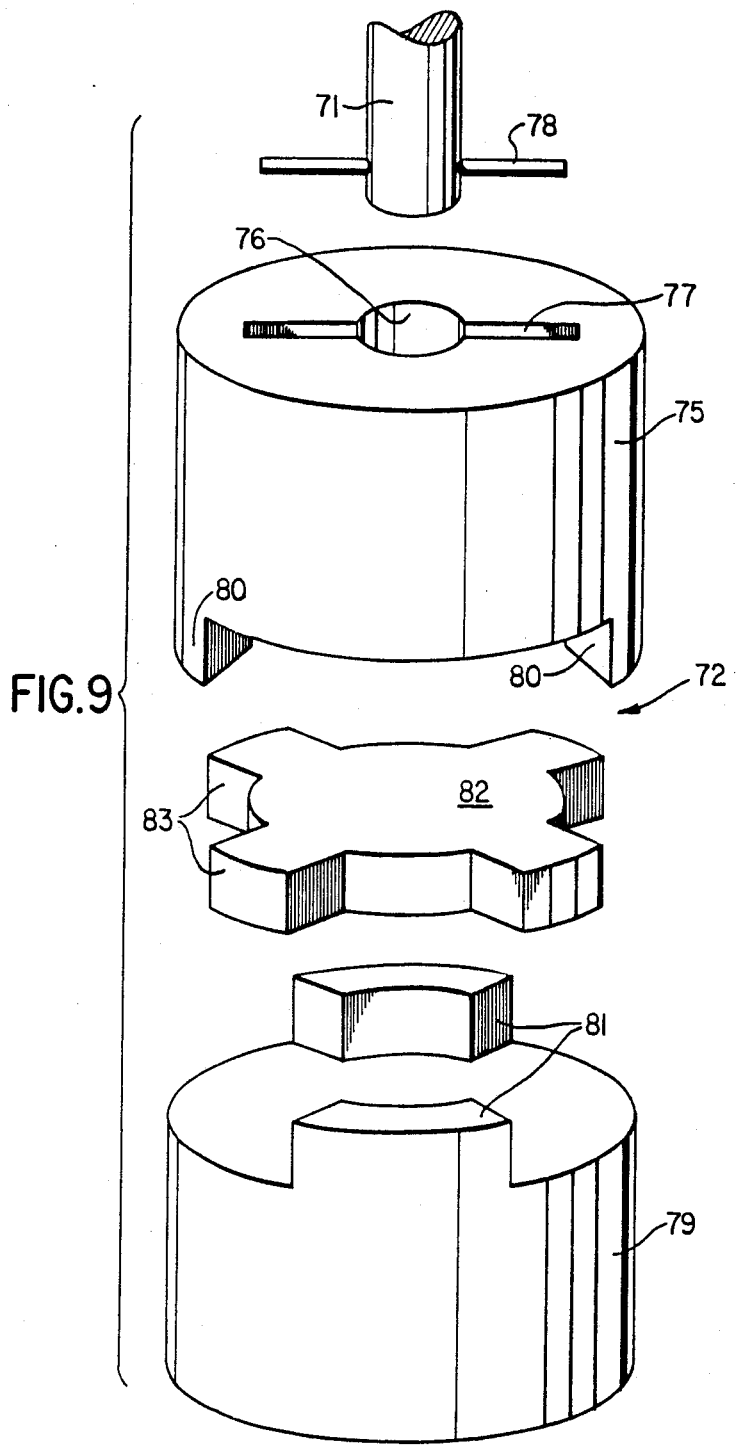
FIG. 9 is an exploded perspective view showing a detail of the tool.

Most of the remaining shock of the impact between the detent 99a and the pins 87, 88 is absorbed by the spring 82 that is positioned between the latch cage 79 and the torque drive element 75 as described in relation to FIG. 9. The torsion spring 82 provides a rubber coupling that can deform elastically when stressed between the lugs 80 and 81 to absorb the peak load stresses that would otherwise be applied between the detent 99a and the pins 87, 88. Once the peak stress has been absorbed, the spring 82 relaxes slightly, the total deflection of the spring in operation being relatively small, and amounting to no more than from about 2° to 5° of rotation. Accordingly, the required orientation between the rotor 49 and the latch cage 79 can still be maintained quite accurately.

Figure 12:
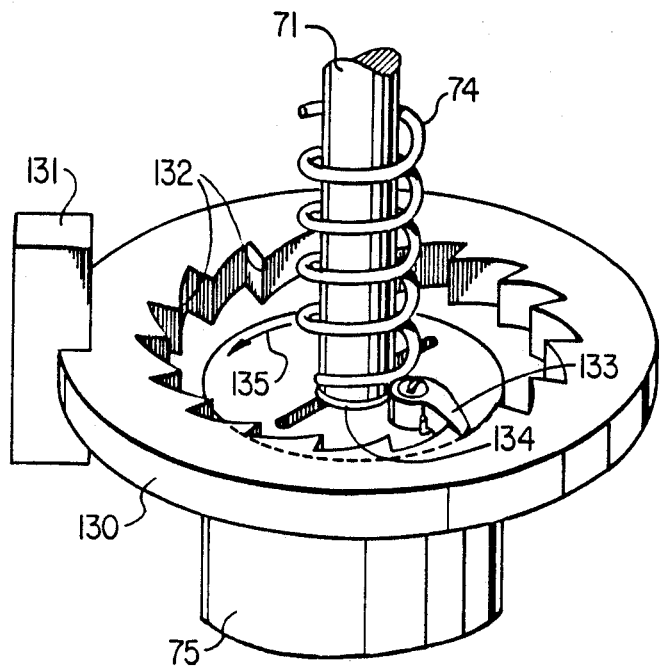
FIG. 12 is a somewhat schematic perspective view of a ratchet arrangement that can be used in the tools shown in FIGS. 1 to 11.

Since pump strokes from the positive displacement pump normally used in drilling may cause some variations in instantaneous flow rate, the rotor assembly may tend to resonate at the pump stroke rate or a harmonic or sub-harmonic thereof. This may be dampened somewhat by the dampener assembly 62 but there is some backlash play of the pin 66 in the slot 67 of the dampener collar 63. To restrict this oscillation to acceptable levels (i.e. less than about 10° peak to peak) there could be a one way ratchet mechanism, as shown in FIG. 12, with stops every 10° or so. This mechanism must be rotationally oriented so that it will not latch the impact torque and hold this peak torque between pins 87, 88 and the detent 99a which could mean the solenoid 90 would not have enough pull force or the spring 97 would not have enough push force to take the detent 99a off the pins 87, 88.

As shown in FIG. 12 the ratchet mechanism comprises a ratchet ring 130 that is fixed with respect to the lower latch sleeve 57b by means of a key 131 and is formed with a series of inwardly directed teeth 132. In all there are forty teeth 132, although for simplicity in illustration, a lesser number is shown in FIG. 12. With forty teeth, the stops are provided at angular intervals of 9°. The ratchet ring 130 co-operates with a pawl 133 that is pivotally attached to the top face of the torsion drive element 75 and is urged to swing outwardly to engage the teeth by a torsion spring 134 carried on the lower shaft extension 71. The drive element 75 is rotated step-wise in the direction of the arrow 135 in angular increments of 45° (corresponding to the spacing between successive pins 87 and 88) each increment moving the pawl 133 past five of the forty ratchet teeth 132.

Figure 7:
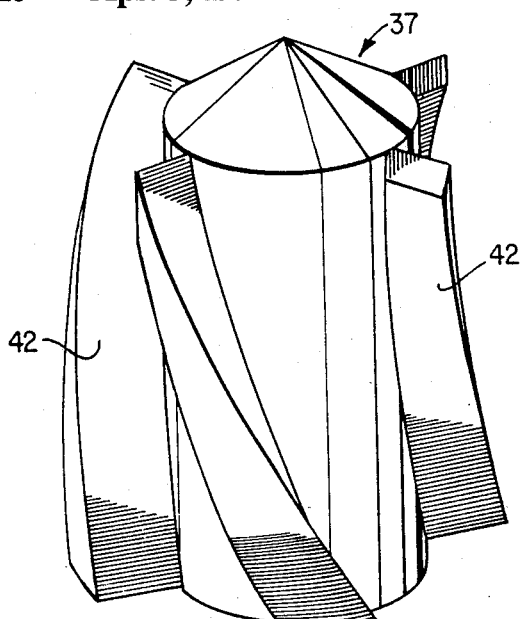
FIGS. 7 and 8 are perspective views showing respectively a stator and a rotor as used in the tool shown in FIG. 2A.
Figure 8:
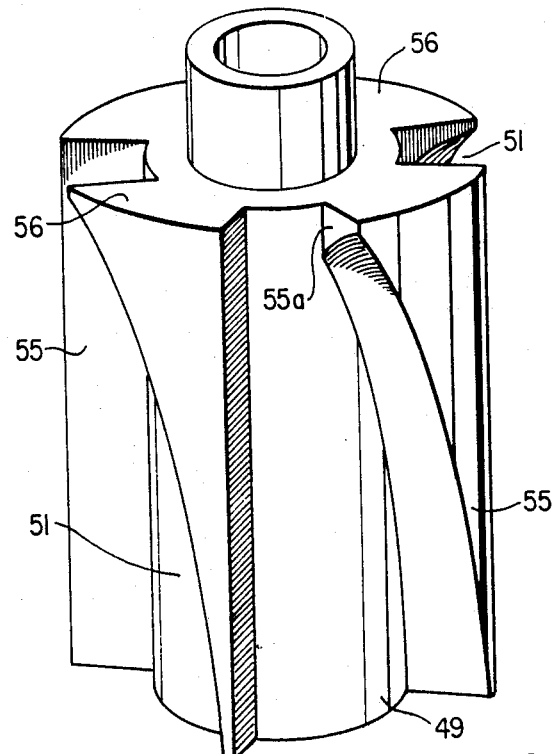

As will be appreciated by those skilled in the art, in the rotor-stator arrangement shown in FIGS. 2, 7 and 8, the fluid flow will generate Bernoulli forces which will tend to drive the rotor 49 towards the closed position in relation to the stator vane 42, and to resist rotation of the rotor away from this closed position. In the arrangement shown, the Bernoulli forces are overcome because of the large torque in the desired direction of rotation that is generated by the inclination of the stator vanes 42. This is because some high velocity fluid flows past the outer diameter of the rotor vanes 55 in the gap between the rotor vanes and the containment sleeve 36 which both drags the vanes by friction, and also causes reactive force as the fluid is forced to change direction as a result of striking other blades. The rotor blades are shaped as they are so that the area 55a on the trailing edge of the rotor 49 is minimized to reduce the Bernoulli force, to straighten the flow as it moves down the rotor blades and to minimize backwards reactive force caused by the fluid that jets over the leading edge of the top face of the rotor striking the preceding vane. However, in order to guarantee enough force to cause the rotor to move from the closed position to the open position, a fairly high angle is required on the stator vanes causing an excessively high force in the desired direction when the rotor is in the open position which requires that the latching control parts be made stronger than one would like. These parts include the actuating device (solenoid or motor mechanism), the shaft 99 and the bearings on it, the pin cage 73, the shock absorber spring 82, and the hydraulic dampener 62. Furthermore, the reactive force which holds the rotor in the closed position against the appropriate stop in the latch cage tends to be relatively weak because of the design optimizations, and the rotor may tend to oscillate off the stop at the closed position due to fluctuations in the flow velocity which are normal with conventional equipment. This reduces the average size of the pressure pulse. This problem may be overcome by use of the one way ratchet mechanism of FIG. 12 to allow motion only in the desired direction.

Figure 13:
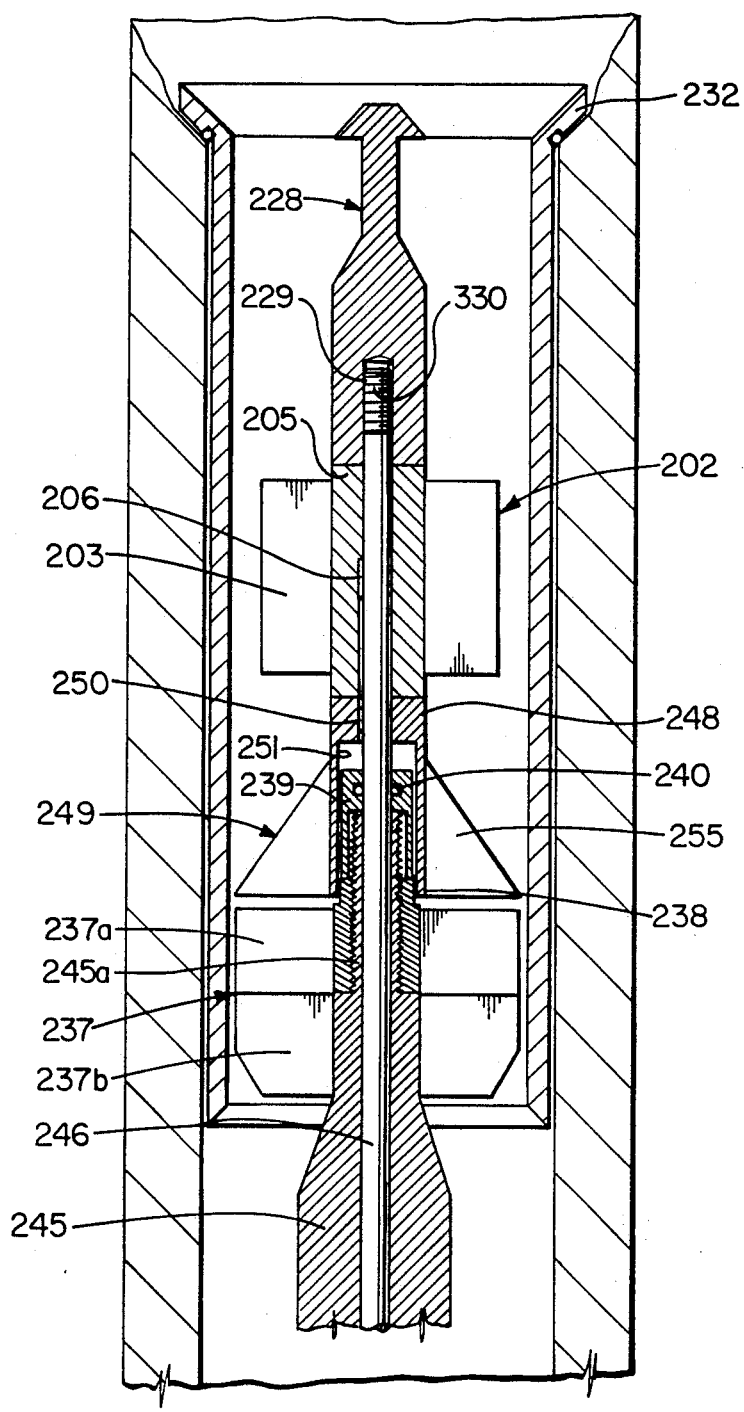
FIG. 13 is a view similar to FIG. 2A showing a presently preferred alternative embodiment.
Figure 14:
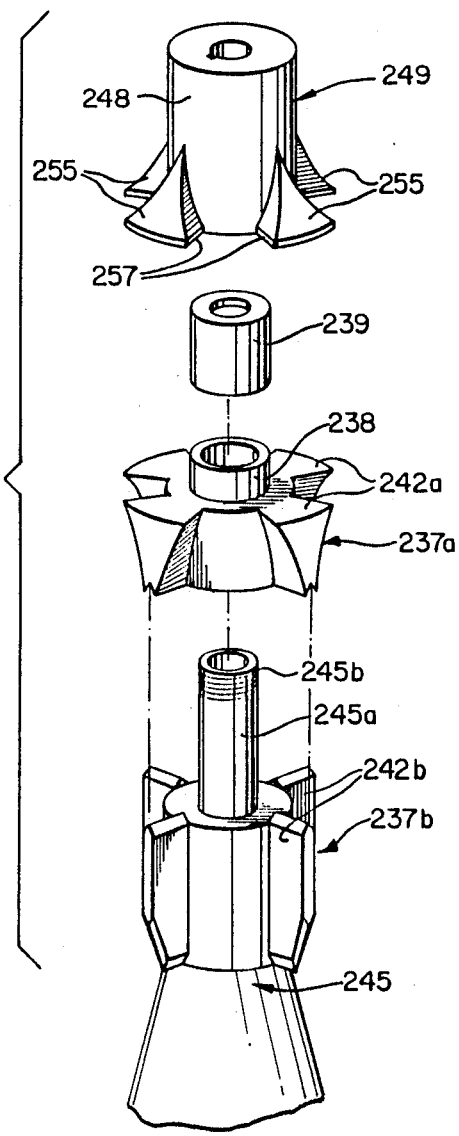
FIG. 14 is an exploded view showing individual components of the embodiment of FIG. 13.

The above described problems are also overcome by the alternative embodiment of the rotor-stator arrangement as shown in FIGS. 13 and 14. In this embodiment, in order to further reduce the diameter of the logging tool so as to make it retrievable in more situations, the containment sleeve 36 as shown in FIG. 2A is eliminated, by rearranging the order of the stator, the rotor, and the impeller. Referring to FIG. 13, which is a longitudinal sectional view equivalent to the upper portion of FIG. 2A, within the polish sleeve or diameter reducer sleeve 232 there is no containment sleeve around the impeller, but rather the spear-point main shaft assembly 246. Positioned on this shaft assembly below the spear-point assembly is an impeller 202 coupled to rotate with the shaft assembly 246 by means of a key 206. The impeller includes a series of projecting angularly arranged inclined vanes 203.

Beneath the impeller the shaft assembly 246 passes through the hub 248 of a rotor or restrictor 249 which is coupled to rotate with the shaft assembly by means of a key 250. The form of the restrictor 249 is more clearly shown in FIG. 14 and it will be seen to include a series of upwardly tapering radially projecting ribs 255 which are equally angularly spaced and separated by channels 256. As shown in FIG. 14, these ribs 255 gradually increase in angular and radial extent downwardly of the hub 248, and have on their confronting sides to narrow land surfaces 257 to minimize Bernoulli forces as described earlier in connection with FIG. 8. The undersides of the ribs 255 are flat.

In contrast to the embodiment described in connection with FIGS. 1-12, the embodiment of FIGS. 13 and 14 includes a stator arrangement 237 that is of two part construction. On the upper end of the reducer 245 is a tubular hub 245a with a screw threaded upper end 245b. Below the hub 245a the reducer has a fixed thereto a series of radially projecting axially extending vanes 242b of a diameter slightly less than the internal diameter of the reducer sleeve 232. The upper edges of these vanes 242b have a sharp inverted V-profile as seen in FIG. 14, these vanes 242b constituting the lower portion 237b of the stator. The upper portion 237a of the stator is best shown in FIG. 14 and comprises a tubular hub having a series of radially projecting axially oriented vanes 242a corresponding in number and spacing to the vanes 242b, and having flat upper ends positioned close to the flat undersides of the ribs 255, tapering in angular extent downwardly, the lower ends of the vanes 242a having V-shaped recesses or notches designed to receive the upper edges of the vanes 242b. On the upper side of the upper stator section 237a is a short tubular spigot 238, the bore of the stator section 237a and spigot 238 passing over the tubular reducer hub 245a so that when the upper and lower vanes 242a and 242b are in engagement the screwthreaded upper end of the hub 245a projects above the spigot 238.

Positioned above the stator assembly is a tubular seal holder 239 having a lower internally threaded section 239a that is threadedly engaged with the upper end of the reducer hub 245a so that the lower end of this seal holder 239 presses upon the spigot 238 and secures the upper stator section 237a in fixed engagement with the lower section 237b and to the reducer 245. As shown in FIG. 13, the shaft assembly 246 passes through the upper and lower stator sections and the seal holder 239, and the clearance between the latter and the shaft assembly carries a suitable rotary seal 240 such as in the form of an O-ring seal. It should be noted that only a low pressure seal is required for this application since because of the pressure compensation as described in relation to FIG. 2B, the pressure differential across seal 240 is small.

The shaft 246 (as in the embodiment shown in FIG. 2A) rotates with clearance within the reducer 245 and the seal holder 239.

As seen in FIG. 13, the seal holder 239 is received within a large counterbore 251 in the restrictor 249.

It will be appreciated that the arrangement described and illustrated in connection with FIGS. 13 and 14 will, for a given flow area, enable the diameter of the tool to be reduced as compared to the embodiment of FIGS. 2-12. In the embodiment of FIGS. 13 and 14, the spear point assembly 228 being threaded to the main shaft assembly 246 means that during retrieval, the entire weight of the tool is supported by the shaft assembly 246.

Furthermore, although there is no seal between the stator vanes 242a, 242b and the reducer sleeve 232, the small bypass flow of fluid which could pass around the stator through such clearance will not significantly affect the pressure signal size. It will be noted that in contrast to the first described embodiment, in the embodiment of FIGS. 13 and 14 the stator vanes 242a, 242b are purely radial in form and do not lie at an angle to the axis of the shaft 246.

It will be appreciated that in operation, with the parts arranged as in FIG. 13, a flow of drilling fluid passing downwardly through the reducer sleeve 232 will interact with the angled impeller blades 203 to apply a torque to the shaft assembly 246. The value of this torque will depend upon the flow conditions that are encountered, and the impeller 202 is designed for such flow conditions so that it will generate sufficient but not excessive torque. In fact, a series of differently configured impellers 202 is provided each having different pitches and lengths in its vanes 203. For a given application, an impeller is chosen that will provide sufficient but not excess torque. Excess angular acceleration being applied to the shaft assembly 246 when released by the latch arrangement 73 thus requiring an elaborate shock absorbing and dampening means such as that described in relation to FIGS. 2A and 2B. Another method of limiting the torque that is applied by the impeller 202 to the shaft assembly 246 is to provide a slip clutch arrangement (not illustrated) between these two elements, so that once a selected level of torque is exceeded, slippage can take place between the impeller and the shaft assembly so that no excessive loads are applied to the latch 73.

Figure 10:
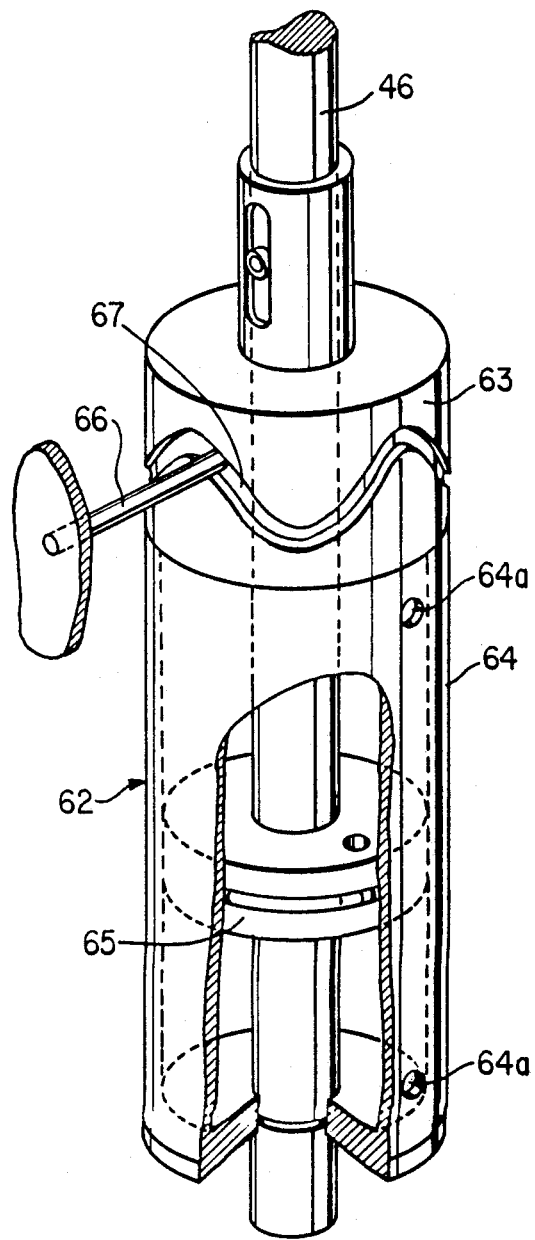
FIG. 10 is a fragmentary perspective view showing a detail of the tool.
Figure 11:
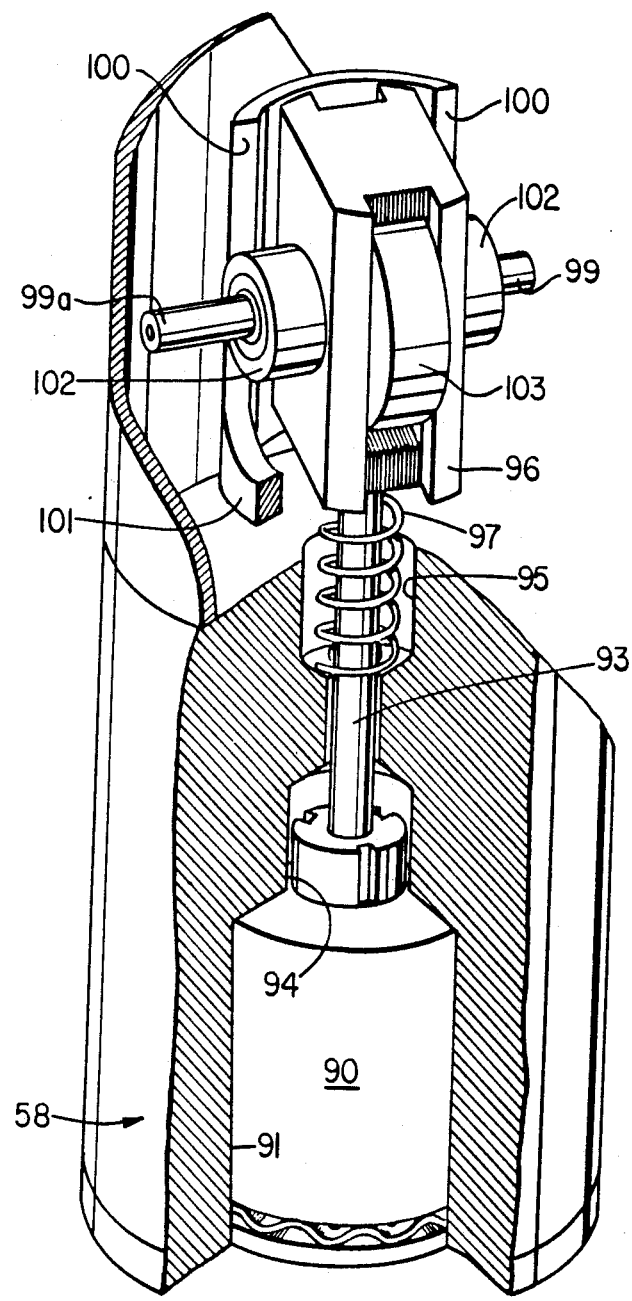
FIG. 11 is a fragmentary and partly sectioned perspective view showing a further detail.
Figure 16:
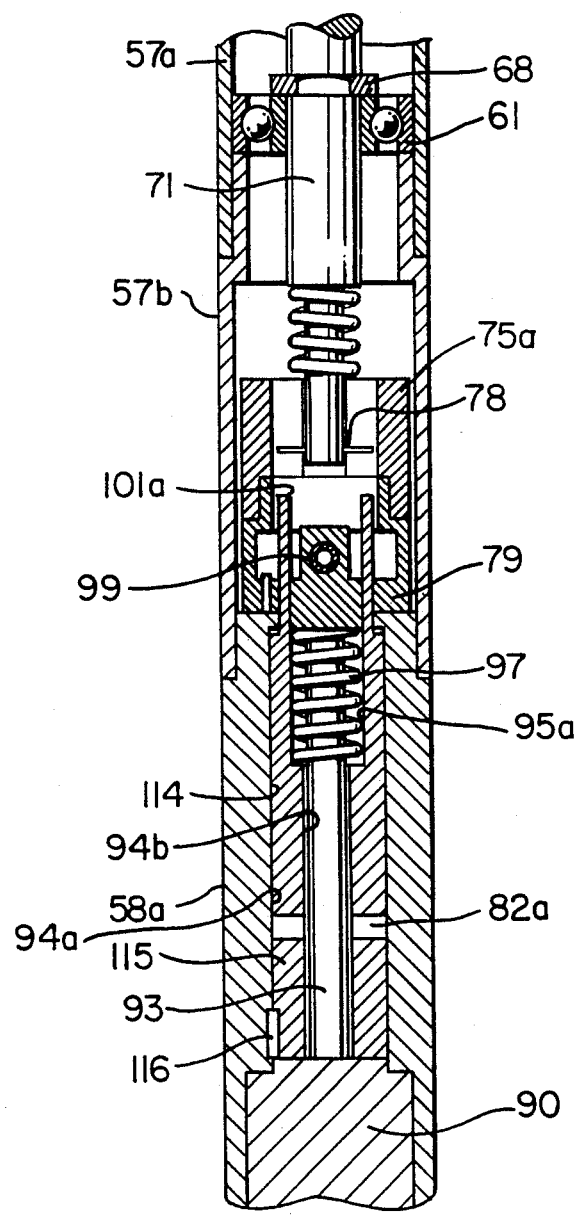
FIG. 16 is a view corresponding to the upper part of FIG. 2B showing a modified arrangement.
Figure 17:
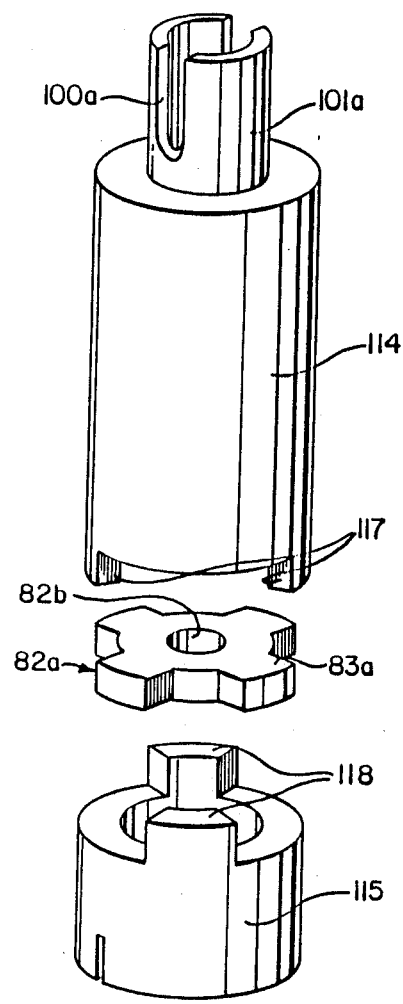
FIG. 17 is an exploded view of certain components of FIG. 16.

By limiting the torque applied to the shaft assembly 246 by either of the means described above, and by redesigning the shock absorbing arrangement of the tool, it is possible to dispense with the hydraulic dampener described in relation to FIGS. 2A and 10. Such a modified arrangement is shown in FIGS. 16 and 17. As seen in FIG. 16, the lower extension 71 of the shaft assembly 46 passes through a bearing 61 seated between the upper latch sleeve 57a and the lower latch sleeve 57b, the lower end of extension 71 carrying a pin 78 that engages in a modified torsion drive element 75a that is directly coupled to the latch cage 79, i.e. without the interposition of the spring 82 shown in FIG. 9. For this purpose the inter-engaging lugs 80 and 81 merely have to be angularly enlarged. Alternatively other means can be provided for direct engagement between the torsion drive element and latch cage 79. In this embodiment, a modified spring dampener element 82a is positioned below the latch structure. The solenoid housing 58a in FIG. 16 has an enlarged bore 94a in which is received a tubular piece 114 which in turn is formed with a bore 94b (through which passes the solenoid rod 93) and at its upper end a counterbore 95a to receive the spring 97. An upwards extension 101a of the tubular piece 114 is formed with the slots 100a for engagement by the rollers 102 of the shaft 99 as described in relation to FIG. 11. Within the bottom end of the bore 94a and fixed thereto by a key 116 is a lower tubular piece 115. The spring dampener 82a is positioned between the confronting ends of the upper and lower tubular pieces and its configuration is more clearly shown in the exploded view of FIG. 17. As before, the dampener 82a is of cruciform appearance having four projecting arms 83a. It also includes a bore 82b for passage of the solenoid shaft 93. The confronting ends of the upper and lower tubular pieces 114, 115 have projecting lugs 117, 118 respectively adapted to enter in opposed pairs into the recesses between the arms 83a. It will thus be seen that since the lower tubular piece 115 is fixed to the solenoid housing 58a, and the upper tubular piece 114 supports the shaft 99, impacts applied to the shaft 99 through engagement with successive pins 87, 88 of the latch structure are applied as compression loads to the arms 83a of the dampener 82a. By proper design of this dampener 82a, it can be caused to absorb all of the impact energies that arise, thus making it possible to dispense with the hydraulic dampener assembly 62 as shown in FIG. 2A and the ratchet assembly shown in FIG. 12. Thus the composition of the dampener 82a must be such that not only is it resilient, but that it can also absorb and dissipate energy. Many compositions of rubber are suitable for this purpose, and specifically preferred rubbers will have between 55 and 70 durometer hardness, which along with the width of the arms of 82a (or 82) will set the spring constant of the torsional spring so that the angular position of the rotor is reasonably controlled when it is latched against the range of torques of 10 to 30 inch-pounds to be supplied by the impeller. The rubber should also lose at least 75 percent of the input energy to deformation so as to act as a dampener of impact oscillations as well as a spring and to possibly eliminate the requirement for the hydraulic dampener and the one way ratchet assembly in most applications. Such a material is Neoprene, which can be molded in a suitable durometer range and which loses approximately 80 to 90 percent of its impact energy to deformation up to a reasonable temperature of 125 to 150 degrees Celsius.

The rotor drive arrangement illustrated in FIGS. 13 and 14 has significant advantages over that described in relation to FIGS. 2A, 7 an 8. Specifically, the stator 237 is straight and streamlined thus reducing resistance to the flow of drilling mud. The rotor is of shorter axial length reducing the back reactive force, and both the leading and trailing edges of the rotor ribs 255 are narrow to reduce the Bernoulli forces in either direction. The impeller blades are designed to be able to provide enough torque to the rotor at minimum flow rate of the drilling mud to overcome all the forces that arise and to generate the required signal strength. These torque requirements are reduced by the design of the rotor 249 as compared to that of the earlier embodiment so that the strength and complexity of the other element of the control mechanism can be correspondingly reduced. For normal mud flow conditions, the ratchet arrangement of FIG. 12 would not be required with the embodiment of FIGS. 13 and 14, except to limit oscillations which might occur in situations where the fluid flow rate was very low and extremely variable.

What I claim as my invention is:

1. A remote sensing system comprising a tool for positioning at a predetermined location in a conduit through which a flow of fluid is circulated, said tool including a pressure modulator adapted to transmit signals indicative of selected parameters existing at said location, such signals being in the form of positive pressure pulses transmitted through the fluid to a remote receiver, said pressure modulator comprising:
   a stator co-axially arranged in said tool and having angularly spaced channels therein that extend from an upstream end of the stator to a downstream end thereof to define passage means through which at least a portion of said fluid flow is to be directed;
   blocking means adjacent said stator and movable between an inoperative condition wherein it is positioned in non-restrictive relationship relative to said passage means, and an operative condition wherein it effects rapid, temporary, at least partial restriction of said passage means to generate said positive pressure pulses, said blocking means comprising a rotor element rotatably mounted in the path of fluid flow and having angularly spaced radially projecting ribs thereon, said ribs in said operative condition occluding said passage means;
   impeller means interacting with the fluid flow to apply a driving torque to said rotor said impeller means being directly coupled to said rotor so that the rotor is urged to follow angular movement of the impeller means;
   latching means effective to retain said rotor in the inoperative condition against the driving torque applied to said rotor; and
   electrical actuator means for said latching means said actuator means being selectively energizable to release said latching means and free said rotor to undergo incremental angular movements away from the inoperative condition to the operative condition and again to said inoperative condition under the influence of said driving torque.

2. A system according to claim 1 wherein said channels are defined between radially extending webs formed on said stator.

3. A system according to claim 2 wherein rotor is positioned axially adjacent one end of said stator, the number size and distribution of the stator webs and of the rotor ribs corresponding such that in the operative condition the passage means is substantially wholly occluded by said ribs and in the inoperative condition the passage means is not substantially occluded by said ribs.

4. A system according to claim 1 wherein said impeller means is in the form of a turbine wheel having angled blades projecting into the path of the fluid flow, said turbine wheel being coupled to drive said rotor.

5. A system according to claim 1 including damper means operatively connected to said rotor to prevent excessive acceleration thereof when disengaged by said latching means.

6. A system according to claim 1 wherein said dampener means comprises a hydraulic damper having a piston fixed on a shaft coupled to said rotor and siding in a cylinder which is mounted to rotate with said shaft and is adapted to be oscillated axially of the shaft upon such rotation, such oscillation producing flow of dampening fluid within said cylinder from one side of the piston to the other through at least one restriction, and thus dampening such movement.

7. A system according to claim 5 including a one-way ratchet mechanism coupled to said rotor element to prevent rotation thereof in the direction opposed to said single direction, said ratchet mechanism having a series of teeth sufficient in number as to limit possible angular oscillation of said rotor to less than about 10°.

8. A system according to claim 1, further including a shock-absorbing spring arrangement operatively coupled between said rotor and said latching means to absorb the impact energy of engagement of the latching means.

9. A system according to claim 1 wherein said rotor element is in the form of a turbine, said impeller means comprising peripherally spaced angled blades that are integral with said ribs and are adapted to be driven by said fluid flow.

10. A system according to claim 9 wherein said angularly spaced channels are defined between radially extending webs of said stator, said rotor being rotatably mounted co-axially of the tool adjacent one end of the stator, said rotor ribs at a spacing corresponding to that of said stator channels.

11. A system according to claim 10 wherein said actuator means comprises a solenoid that controls a reciprocating rod that extends in the axial direction of the tool and carries a detent that projects into said latching means.

12. A system according to claim 11 wherein said latching means comprises a cage that is fixed to rotate with said rotor, said cage having a series of equiangularly spaced abutments thereon, said detent being positioned in the path of rotation of said abutments when said latching means is in the operative condition, such that one said abutment is engaged by said detent to support said rotor against rotation under the influence of said fluid flow.

13. A system according to claim 12 wherein said cage contains a first and a second set of said abutments, the abutments of said second set being arranged in opposed relationship to those of said first set and angularly offset with respect thereto such that when said detent is moved by actuation of said rod to disengage an abutment of one set, it is moved into the path of the abutments of the second set thereby to limit the incremental angular movement of the rotor.

14. A system according to claim 13 wherein said first and second sets of abutments are provided by axially extending protuberances arranged in opposed angular rings in said cage, said detent being in the form of a transverse shaft carried on said reciprocating rod and having a projecting shaft and adapted to engage said protuberances in succession.

15. A retrievable well-logging tool that is of elongate form and is adapted to be lowered through the interior of a drill string to a desired location to transmit signals therefrom to the surface through the drilling fluid, said tool having at the upper end thereof a spear point arrangement enabling lowering of the tool to a predetermined location in the drill string by a soft-releasing tool engaging therewith, said well-logging tool being subsequently retrievable by engagement of said spear point assembly by an overshot tool, said tool including a pressure modulator adapted to transmit signals indicative of selected parameters existing at said location, such signals being in the form of positive pressure pulses transmitted through the drilling fluid to a remote receiver on the surface, said pressure modulator comprising:

a stator co-axially arranged in said tool and having angularly spaced channels therein that extend from an upstream end of the stator to a downstream end thereof to define passage means through which at least a portion of said fluid flow is to be directed;

a rotor element rotatably mounted in the path of drilling fluid flow adjacent said stator and movable angularly between an inoperative condition wherein it is positioned in non-restrictive relationship with respect to said channels and an operative condition wherein it effects rapid, temporary, at least partial restriction of said passage means to generate said positive pressure pulses, said rotor element having angularly spaced radially projecting ribs thereon that pass alternately between said operative condition wherein they occlude said passage means, and the inoperative condition;

impeller means interacting with the fluid flow to apply a driving torque to said rotor, said impeller means having angled blades projecting into the path of the fluid flow to interact therewith so that the impeller is urged to rotate thereby, said impeller being directly coupled to said rotor;

latching means effective to retain said rotor in the inoperative condition against said driving torque; and electrical actuator means for said latching means said actuator means being selectively energizable to release said latching means and free said rotor to undergo incremental angular movements away from the inoperative condition to the operative condition and again to said inoperative condition under the influence of said driving torque.

16. A well-logging tool according to claim 15 wherein said latching means comprises a cage that is fixed to rotate with said rotor element, said cage having two sets of angularly spaced abutments, the abutments of the second set being arranged in opposed relationship to those of the first set and angularly offset with respect thereto, said electrical actuator means comprising a solenoid-actuated reciprocating rod that extends in the axial direction of the tool and carries a detent that project into said cage, said detent being positioned in the path of rotation of the abutments of the first set when said latching means is in the engaged condition such that one said first abutment is engaged by said detent to support said rotor in its inoperative condition against rotation under the influence of the driving torque supplied through said impeller, such that when said detent is moved by actuation of said solenoid to disengage an abutment of said first set, it is moved into the path of the succeeding abutment of the second set, thereby to arrest the incremental angular movement of the rotor element in the operative condition of the blocking means.

17. A well-logging tool according to claim 16 wherein said two sets of angularly spaced abutments are provided in the form of axially extending protuberances arranged in opposed annular rings in said cage, said detent being in the form of a transverse shaft carried on said solenoid actuated reciprocating rod and having a projecting shaft end adapted to engaged said protuberances.

18. A well-logging tool according to claim 16, including dampener means operatively connected to said rotor element to prevent excessive acceleration thereof when disengaged by said latching means, said dampener means comprising a hydraulic damper having a piston fixed on a shaft that is coupled to said rotor and is slidably arranged in a cylinder that is mounted to rotate with said shaft and is adapted to be oscillated axially of a shaft upon rotation thereof, such oscillation producing flow of dampening fluid within said cylinder from one side of the piston to the other side and thus dampening such movement.

19. A well-logging tool according to claim 16 including a shock-absorbing spring arrangement operatively coupled to said latching means to absorb the impact of engagement of the latter.

20. A well-logging tool according to claim 16 including a shock-absorbing spring arrangement operatively coupled to said latching means to absorb the impact of engagement of the latter.

21. A method of pressure pulse telemetry, comprising
positioning a signalling tool in a conduit through which fluid is flowing, said tool comprising a stator that partially blocks the conduit while leaving at least one passage to conduct fluid from upstream to downstream of the stator, and a rotor that is angularly movable in the conduit adjacent the stator, said rotor having at least one channel therethrough positioned to be moved, upon angular movement of the rotor, between an operative position in which the rotor substantially restricts flow through the stator passage, thereby creating a positive pressure pulse, and an inoperative position in which the rotor causes substantially less restriction of flow through the stator passage,
utilizing the force of the flow of the fluid through the conduit to continuously urge the rotor to move angularly,
repeatedly at controlled intervals releasing the rotor for angular movement between the inoperative and operative positions and stopping the rotor at each occasion it reaches the inoperative position to create a coded series of positive pressure pulses for transmission through said fluid, and
receiving and interpreting said positive pressure pulses at a location remote from said signalling tool.

22. A method according to claim 21 comprising stopping said rotor in the operative position by a latching means, and releasing said rotor for angular movement by means of a selectively energizable electrical actuator controlling said latching means.

23. A method according to claim 21 wherein the force of the flow of the fluid through the conduit is utilized by providing a bladed impeller wheel to interact with the fluid flow, and coupling said impeller wheel directly to said rotor.

24. A method according to claim 23 wherein said rotor is provided with a series of angularly spaced vanes and is mounted to rotate adjacent one end of the stator, the stator having a series of said passages corresponding in number and location to the vanes of said rotor to be substantially occluded thereby when the rotor moves to its operative position.

25. A method according to claim 24 including dampening the movement of said rotor to prevent excessive acceleration thereof when released by the latching means.

26. A method according to claim 25 including providing shock absorbing means to cushion the impact of engagement of said rotor by said latching means.

27. A method of well-logging, comprising
positioning a signalling tool in the bore of a drill string through which drilling fluid is flowing, said tool comprising a stator that partially blocks the bore while leaving at least one passage to conduct fluid from upstream to downstream of the stator, and a rotor that is angularly movable in the bore adjacent the stator, said rotor having at least one channel therethrough positioned to be moved, upon angular movement of the rotor, between an operative position in which the rotor substantially restricts flow through the stator passage, thereby creating a positive pressure pulse, and an inoperative position in which the rotor causes substantially less restriction of flow through the stator passage,
utilizing the force of the flow of the fluid through the drill string bore to continuously urge the rotor to move angularly,
repeatedly at controlled intervals releasing the rotor for angular movement between the inoperative and operative positions and stopping the rotor at each occasion it reaches the inoperative position to create a coded series of positive pressure pulses for transmission through said fluid, and
receiving and interpreting said positive pressure pulses at a location remote from said signalling tool.

28. A remote sensing system comprising a tool for positioning at a predetermined location in a conduit through which a flow of fluid is circulated, said tool including a pressure modulator adapted to transmit signals indicative of selected parameters existing at said location, such signals being in the form of positive pressure pulses transmitted through the fluid to a remote receiver, said pressure modulator comprising:
a stator co-axially arranged in said tool and having at least one channel therein that extends from an upstream end of the stator to a downstream end thereof to define passage means through which at least a portion of said fluid flow is to be directed;
rotor means adjacent said stator and rotatable from an operative condition wherein it effects rapid, temporary, at least partial restriction of said passage means to generate a positive pressure pulse, an inoperative condition wherein it is positioned in restrictive relationship relative to said passage means;
impeller means for interacting with the fluid flow to apply a driving torque to said rotor, said impeller means being directly coupled to said rotor so that the rotor is urged to follow angular movement of the impeller means;
latching means effective to retain said rotor in the inoperative condition against the driving torque of the impeller means; and
electrical actuator means for said latching means, said actuator means being selectively energizable to release said latching means and free said rotor to undergo incremental angular movements away from the inoperative condition to the operative condition and again to said inoperative condition under the influence of said driving torque.

29. A retrievable well-logging tool that is of elongate form and is adapted to be lowered through the interior of a drill string to a desired location to transmit signals therefrom to the surface through the drilling fluid, said tool having at the upper end thereof a spear point arrangement enabling lowering of the tool to a predetermined location in the drill string by a soft-releasing tool engaging therewith, said well-logging tool being subsequently retrievable by engagement of said spear point assembly by an overshot tool, said well-logging tool including a pressure modulator adapted to transmit signals indicative of selected parameters existing at said location, such signals being in the form of positive pressure pulses transmitted through the drilling fluid to a remote receiver on the surface, said pressure modulator comprising:

a stator co-axially arranged in said tool and having at least one channel therein that extends from an upstream end of the stator to a downstream end thereof to define a passage means through which at least a portion of said fluid flow is to be directed;

rotor means adjacent said stator and rotatable from an operative condition wherein it effects rapid, temporary, at least partial restriction of said passage means to generate a positive pressure pulse, and an inoperative condition wherein it is positioned in restrictive relationship relative to said passage means;

impeller means for interacting with the fluid flow to apply a driving torque to said rotor, said impeller means being directly coupled to said rotor so that the rotor is urged to follow angular movement of the impeller means;

latching means effective to retain said rotor in the inoperative condition against the driving torque of the impeller means; and electrical actuator means for said latching means, said actuator means being selectively energizable to release said latching means and free said rotor to undergo incremental angular movements away from the inoperative condition to the operative condition and again to said inoperative condition under the influence of said driving torque.

* * * * *